W. W. HILEY.
INTERCHANGEABLE DRAFT HARNESS.
APPLICATION FILED JULY 5, 1917.
1,266,264.
Patented May 14, 1918.
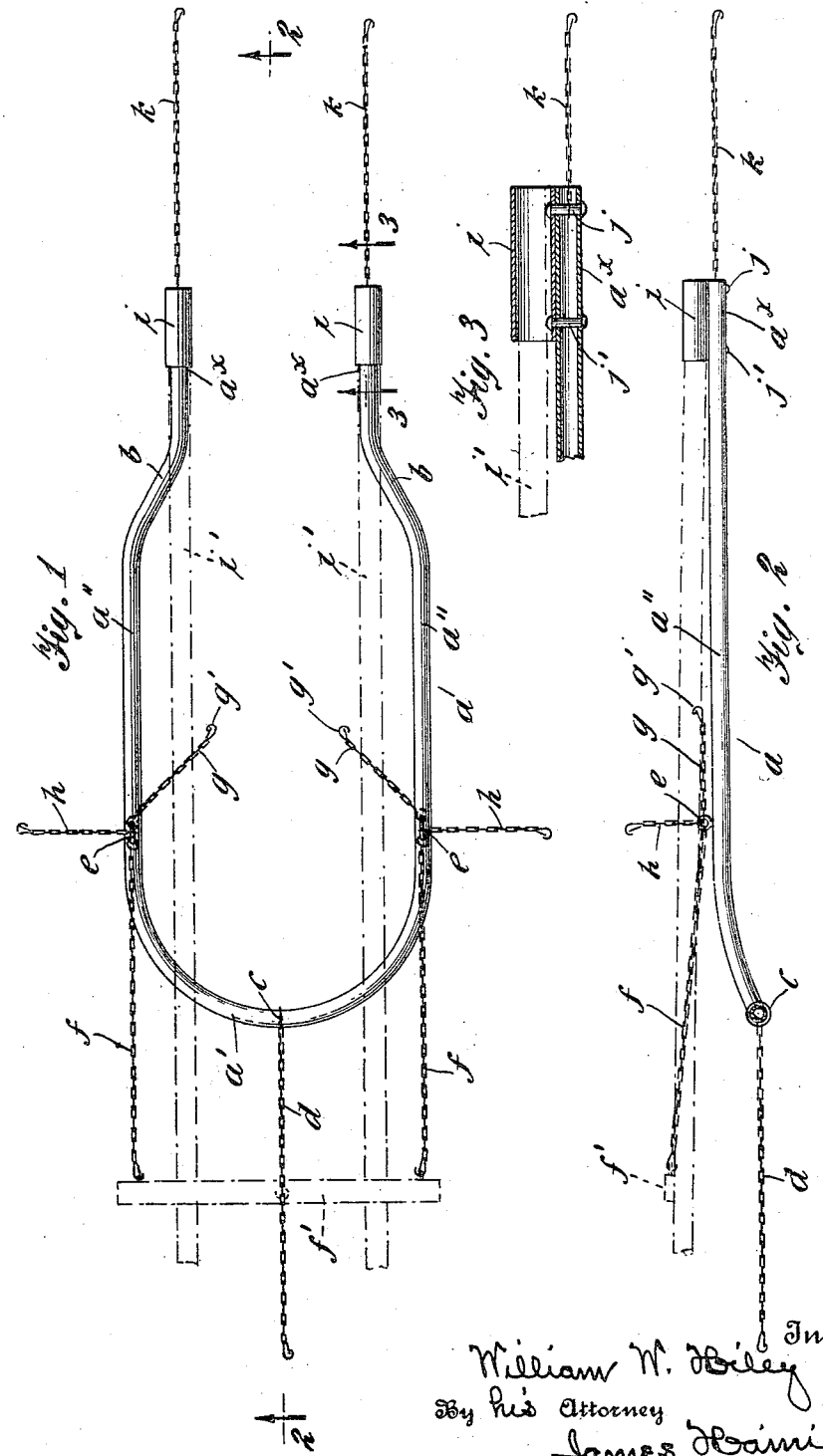
Inventor
William W. Hiley
By his Attorney
James Hamilton

UNITED STATES PATENT OFFICE.

WILLIAM W. HILEY, OF FORT VALLEY, GEORGIA.

INTERCHANGEABLE DRAFT-HARNESS.

1,266,264.  Specification of Letters Patent.  Patented May 14, 1918.

Application filed July 5, 1917. Serial No. 178,844.

*To all whom it may concern:*

Be it known that I, WILLIAM W. HILEY, a citizen of the United States of America, residing at Fort Valley, in the county of Houston and State of Georgia, have invented certain new and useful Improvements in Interchangeable Draft-Harness, of which the following is a specification, reference being had to the accompanying drawings.

This invention relates to improvements in draft-harness and particularly to draft-harness that may be used interchangeably with a plow or a wagon; and an object of this invention is to provide an interchangeable draft-harness which will be simple in construction, comparatively cheap in manufacture and efficient and convenient in operation and use.

In the drawings illustrating the principle of this invention and best mode now known to me of applying that principle, Figure 1 is a plan of the draft-harness; Fig. 2 is a section on the line 2—2 of Fig. 1; and Fig. 3 is a detail illustrating in section on the line 3—3 of Fig. 1 the shaft-holders attached to the free ends of the sides or arms of the harness-frame.

The harness-frame $a$ is substantially U-shaped (Fig. 1) and, as is best shown in Fig. 2, the rear bow-shaped end $a'$ of the frame $a$ lies somewhat (about three inches) lower than the sides or arms $a''$ thereof, whereby the pull is exerted more directly upon the plow-foot (not shown) and it becomes easier to draw the latter through the soil in plowing. At a short distance from the free ends $a^x$ of the arms $a''$, these arms bend outwardly, as shown at $b$, Fig. 1, whereby harmful rubbing of the draft animal (horse, ox or the like) is avoided. Moreover, the frame $a$ is thus given sufficient width to fit any draft animal of ordinary size across the hips. To the bow-shaped rear end $a'$ of the frame $a$, there is slidably fastened, as by means of the eye $c$, one end of a chain $d$ the other end of which is, when the frame $a$ is so put in use, attached to the end of the plow-beam (not shown). Near the rear end of each side or arm $a''$, there is fastened thereto an eye $e$, to each of which eyes is attached one end of a chain $f$ the other end of which is designed to be snapped or otherwise secured to an end of a swingletree $f'$ (Fig. 1) of a wagon or the like, when the frame $a$ is to be used with a wagon, in which case the free ends of the chains $g$ are detachably fastened (as by means of snap-hooks $g'$) to the wagon-shafts $i'$. The other ends of the chains $g$ are, as shown in the drawings, attached to the eyes $e$. To each of the latter, there is fastened also an end of a chain $h$ the other end of which is detachably secured, when the frame $a$ is put in use, to the back-band or saddle of the harness with which the draft animal is equipped. When the frame $a$ is used with a wagon, the front ends of the shafts $i'$ of the latter are passed through the shaft-holders $i$ with one of which is provided the free or front end $a^x$ of each arm $a''$ of the harness-frame $a$. As is best shown in Fig. 2, this frame $a$ is preferably made of metal piping and the shaft-holders $i$ are secured thereto by means of rivets $j$, $j'$. To the shank portion of each front rivet $j$, there is fastened the rear end of a chain $k$; and the front ends of these chains $k$ are detachably secured to the hames of the collar of the harness with which the draft animal is fitted. By varying the effective length of the chains $k$, the harness-frame $a$ may be made to fit draft animals of different lengths.

The manner of use of the draft-harness may be described briefly as follows: Suppose it be required to haul a wagon to a field to be plowed and there to unhitch the draft animal from the wagon and hitch him to a plow. The front ends of the shafts $i'$ are passed through the shaft-holders $i$, the harness-frame $a$ having been secured to the draft-animal's harness by fastening the free ends of the chains $h$ to the backband or saddle of the harness and the free ends of the chains $k$ to the hames of the collar thereof, and the effective length of the chains $k$ having been adjusted to make the harness-frame $a$ fit the length of the draft-animal. The free ends $g'$ of the chains $g$ are then fastened to the shafts $i'$ and the rear ends of chains $f$ are snapped to the whiffletree or whiffletree $f'$. Having arrived at the field to be plowed, the draft-animal is unhitched from the wagon by unfastening the chains $g$ from the shafts $i'$, and the chains $f$ from the swingletree or whiffletree $f'$. The shafts $i'$ are then drawn out of the shaft-holders $i$, after which the rear end of the chain $d$ is hitched to the end of the plow-beam. The harness-frame $a$ may thus be readily changed from the wagon to the plow and vice versa.

I claim:

1. An interchangeable draft harness for attachment to either a wagon or a plow and including a substantially U-shaped harness-frame provided with means for attaching the same to the wagon; and shaft-holders mounted on the ends of the arms of said harness-frame and arranged to receive the ends of the wagon-shafts.

2. An interchangeable draft harness for attachment to either a wagon or a plow and including a substantially U-shaped harness-frame the rear end of which is depressed below the plane of the arms thereof; shaft-holders mounted on the latter arms and arranged to receive the wagon-shafts; and means for attaching said harness-frame to the wagon and the harness of the draft animal.

3. An interchangeable draft harness for attachment to either a wagon or a plow and including a substantially U-shaped harness-frame the rear end of which is depressed below the plane of the arms thereof, which arms are spaced substantially more widely apart at their rear ends than at their front ends; shaft-holders mounted on the front ends of said arms and arranged to receive the ends of the wagon-shafts; and means for attaching said harness-frame to the wagon and the harness of the draft-animal.

Signed at Fort Valley, Georgia, in the presence of the two undersigned witnesses this 20th day of June, 1917.

WILLIAM W. HILEY.

Witnesses:
  W. L. NANCE,
  A. C. RILEY.

Copies of this patent may be obtained for five cents each, by addressing the "Commissioner of Patents, Washington, D. C."